United States Patent
Usui et al.

(10) Patent No.: US 9,872,004 B2
(45) Date of Patent: Jan. 16, 2018

(54) ON-VEHICLE IMAGE CAPTURE DEVICE (71) Applicant: Clarion Co., Ltd., Saitama-shi, Saitama (JP)

(72) Inventors: Tsutomu Usui, Tokyo (JP); Teruki Takahashi, Saitama (JP); Daisuke Yoshida, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 172 days.

(21) Appl. No.: 14/424,056

(22) PCT Filed: Jul. 18, 2013

(86) PCT No.: PCT/JP2013/069498
§ 371 (c)(1),
(2) Date: Feb. 26, 2015

(87) PCT Pub. No.: WO2014/034313
PCT Pub. Date: Mar. 6, 2014

(65) Prior Publication Data
US 2015/0326840 A1    Nov. 12, 2015

(30) Foreign Application Priority Data

Aug. 31, 2012   (JP) ................. 2012-190872

(51) Int. Cl.
*H04N 7/18* (2006.01)
*H04N 9/47* (2006.01)
(Continued)

(52) U.S. Cl.
CPC ............. *H04N 9/735* (2013.01); *H04N 5/332* (2013.01); *H04N 7/18* (2013.01); *H04N 9/04* (2013.01)

(58) Field of Classification Search
None
See application file for complete search history.

(56) References Cited

U.S. PATENT DOCUMENTS

2003/0058350 A1*  3/2003  Ishimaru ............... H04N 9/735
                                                             348/223.1
2005/0174442 A1   8/2005  Yuyama
(Continued)

FOREIGN PATENT DOCUMENTS

JP    2003-163944 A    6/2003
JP    2004-64468 A     2/2004
(Continued)

OTHER PUBLICATIONS

International Search Report (PCT/ISA/210) dated Oct. 29, 2013, with English translation (Four (4) pages).
(Continued)

*Primary Examiner* — Talha M Nawaz
(74) *Attorney, Agent, or Firm* — Crowell & Moring LLP (57) ABSTRACT

Provided is an on-vehicle imaging device installed onboard a vehicle, and equipped with: an imaging unit for capturing an image of a subject, and having sensitivity to at least to the entire visible light spectrum of the red range (R), the green range (G), and the blue range (B), and to the infrared range (Cir); a signal processing unit for carrying out signal processing on video signals of at least a plurality of different bandwidths from a video image captured by the imaging unit; a pixel signal distribution processing unit for extracting pixel signal distribution information of one or more signals among video signals processed by the signal processing unit; a white balance processing unit for performing signal processing using a predetermined gain, so as to bring a video signal to a desired value; and a system control unit for performing control of the white balance processing unit and control of assessment area information for the purpose of extraction of pixel signal distribution information by the pixel signal distribution processing unit. In accordance with the pixel signal distribution information extracted by the pixel signal distribution processing unit, the system control (Continued)

unit performs control to set the gain of the white balance processing unit to a predetermined value.

6 Claims, 7 Drawing Sheets

(51) Int. Cl.
*H04N 9/73* (2006.01)
*H04N 9/04* (2006.01)
*H04N 5/33* (2006.01)

(56) References Cited

U.S. PATENT DOCUMENTS

| 2013/0093929 A1 | 4/2013 | Kouyama et al. | |
|---|---|---|---|
| 2013/0235193 A1* | 9/2013 | Chang | H04N 9/73 |
| | | | 348/143 |
| 2013/0258126 A1* | 10/2013 | Nagoya | H04N 5/232 |
| | | | 348/211.9 |

FOREIGN PATENT DOCUMENTS

| JP | 2004-229154 A | 8/2004 |
|---|---|---|
| JP | 2007-329380 A | 12/2007 |
| JP | 2011-254311 A | 12/2011 |
| WO | WO 2012/004910 A1 | 1/2012 |

OTHER PUBLICATIONS

Extended European Search Report issued in counterpart European Application No. 13834055.9 dated Feb. 19, 2016 (Eight (8) pages).

\* cited by examiner

DISPLAY UNIT
(EXAMPLE OF SUN LIGHT SOURCE)

DISPLAY UNIT
(EXAMPLE OF SODIUM LAMP LIGHT
SOURCE IN TUNNEL OR THE LIKE)

ON-VEHICLE IMAGE CAPTURE DEVICE

INCORPORATION BY REFERENCE

This application is based upon and claims the benefit of priority from prior Japanese Patent Application No. 2012-190872, filed on Aug. 31, 2012, the entire contents of which are incorporated herein by reference.

TECHNICAL FIELD

The present invention relates to an on-vehicle imaging device.

BACKGROUND ART

As a background art of the present technical field, there is Patent Literature 1. In Patent Literature 1, there is description "a vehicle peripheral image processing apparatus includes a light source estimation unit 51 which estimates a light source kind functioning as a light source on the basis of a white balance adjustment signal output from an on-vehicle imaging unit, a color profile storage unit 52 which stores a color profile created for each light source kind to have characteristics reducing influence of the light source kind upon a specific color in a captured image, and a color conversion unit 54 which is responsive to input of an image captured under a light source of the above-described light source kind to read out a color profile corresponding to the light source kind from the color profile storage unit 52 and conduct color correction on the captured image by using the color profile."

CITATION LIST

Patent Literature

PATENT LITERATURE 1: JP-A-2011-254311

SUMMARY OF INVENTION

Technical Problem

In recent years, interest in prevention of traffic accidents and safety has increased. As one element in driving support system of an automobile, research and development of an on-vehicle monitoring imaging device are being conducted vigorously. As a main function of an on-vehicle imaging device, for example, there is a function of recognizing a lane which is a road sign as a subject. For correctly discriminating a kind of a color of a lane, it is necessary to correctly reproduce the color (for example, a white color) of the lane. In a case where the kind of a specific subject (for example, a sign) which becomes a recognition object besides the lane is correctly discriminated, it is also necessary to correctly reproduce the color of the subject. In order to correctly reproduce the color of the subject, therefore, white balance processing is conducted. In some cases, however, color reproduction of the subject using white balance processing cannot be conducted correctly because the light source itself radiates only a wavelength of a specific color like, for example, a sodium light source. In those cases, it is desirable that the kind of the light source can be recognized accurately.

In Patent Literature 1, "a sodium lamp light source is estimated as a light source kind on the basis of a white balance adjustment signal" is stated. Specifically, as for representative input data, it is stated to conduct arithmetic operation on (estimate) a light source kind in a captured image which is the object. For example, in a case where the light source is a sodium lamp, the luminance and an average of R (red), G (green) and B (blue) sometimes resemble those of sunlight tinged with orange by the evening sun. Since the sodium lamp light source cannot be distinguished from an orange light source such as the evening sun, there is a room for improvement. The present invention provides an on-vehicle imaging device capable of estimating the light source accurately and executing white balance processing with a simple configuration.

Solution to Problem

Among aspects of the invention disclosed in the present application, an outline of a representative aspect will be described below briefly.

(1) An on-vehicle imaging device mounted on a vehicle, the on-vehicle imaging device including: an imaging unit for imaging a subject and having a sensitivity in at least a red region (hereafter referred to as R), a green region (hereafter referred to as G), a blue region (hereafter referred to as B), and an all visible light region and an infrared region (hereafter referred to as Cir); a signal processing unit for executing signal processing on a video signal in at least a plurality of different bands included in a video imaged by the imaging unit; a pixel signal distribution processing unit for extracting pixel signal distribution information depending on at least one included in the video signal processed by the signal processing unit; a white balance processing unit for conducting signal processing by using predetermined gains to cause the video signal to have a desired value; and a system control unit for exercising control on the white balance processing unit and exercising control on decision area information for the pixel signal distribution information extraction conducted by the pixel signal distribution processing unit, control being exercised by the system control unit in order to set gains in the white balance processing unit to predetermined values in accordance with the pixel signal distribution information extracted by the pixel signal distribution processing unit.

Advantageous Effects of Invention

According to the present invention, it becomes possible to provide an on-vehicle imaging device capable of estimating an imaging environment more accurately even under a specific imaging environment and executing white balance processing suitable for the imaging environment, with a simple configuration. Other objects, features, and advantages of the present invention will become apparent from the ensuing description of examples of the present invention concerning accompanying drawings.

DESCRIPTION OF EMBODIMENTS

Hereafter, an imaging device according to embodiments of the present invention will be described with reference to the drawings.

Example 1

Figure 1:
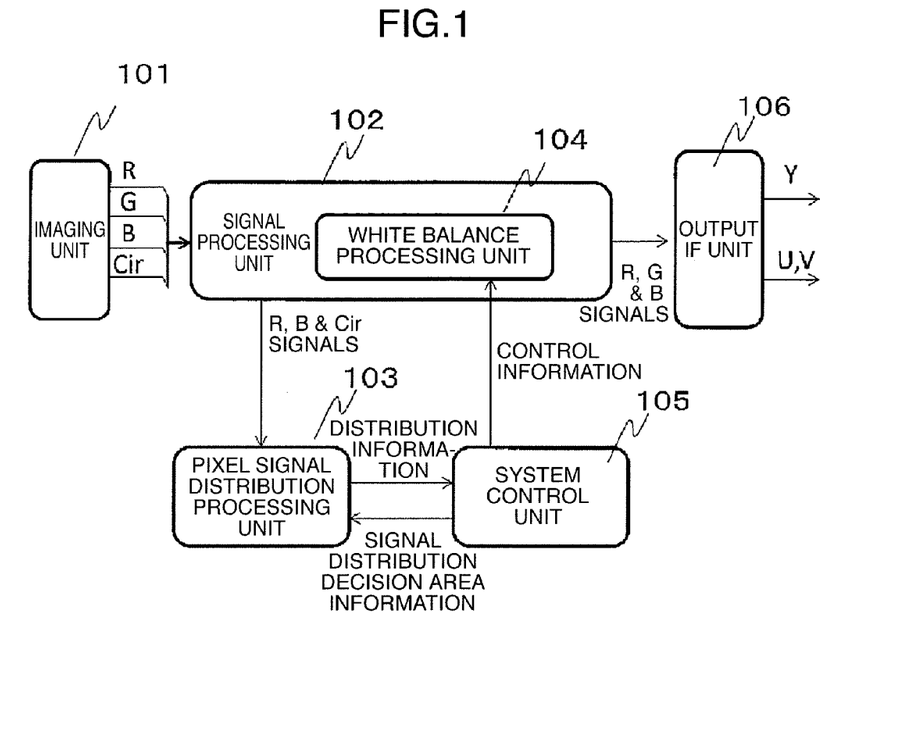
FIG. 1 is a block diagram showing an embodiment of an on-vehicle imaging device according to the present invention.

FIG. 1 is a diagram for explaining blocks in an on-vehicle imaging device in a first example.

The on-vehicle imaging device according to the present example is configured by suitably using an imaging unit 101 using filters of at least four kinds, i.e., a red region, a green region, a blue region, and an all visible light region and an infrared region, a signal processing unit 102 which generates respective color signals, i.e., a red region signal, a green region signal, and a blue region signal (hereafter referred to as R signal, G signal, and B signal, respectively) from a signal including a red region signal, a green region signal, a blue region signal, and an all visible light region and an infrared region signal, a pixel signal distribution processing unit 103 which finds pixel signal distribution information from the R signal, the B signal, and the all visible light region and infrared region signal (hereafter referred to as Cir signal) on the basis of signal distribution decision area information supplied from a system control unit 105 described later, a white balance processing unit 104 which conducts signal processing by applying predetermined gains to cause the R signal, G signal and the B signal to become desired values on the basis of control information supplied from the system control unit 105 described later, a system control unit 105 which exercises control on the white balance processing unit 104 on the basis of the pixel signal distribution information supplied from the pixel signal distribution processing unit 103 and exercises control on the signal distribution decision area information used by the pixel signal distribution processing unit 103 to judge pixel signal distribution, and an output unit 106 which conducts signal conversion from the signals supplied from the signal processing unit 102 to a predetermined video signal. According to the present configuration, it is possible in the imaging unit 101 to obtain information in the infrared region besides the red region, the green region, and the blue region, as described later. By using this, it becomes possible for the system control unit 105 to extract the pixel signal distribution information which differs every scene extracted in the pixel signal distribution processing unit, i.e., every light source, more accurately with a simple configuration, and set gains in the white balance processing unit to predetermined values. White balance processing with a light source corresponding to a scene estimated accurately can be executed.

Figure 2:
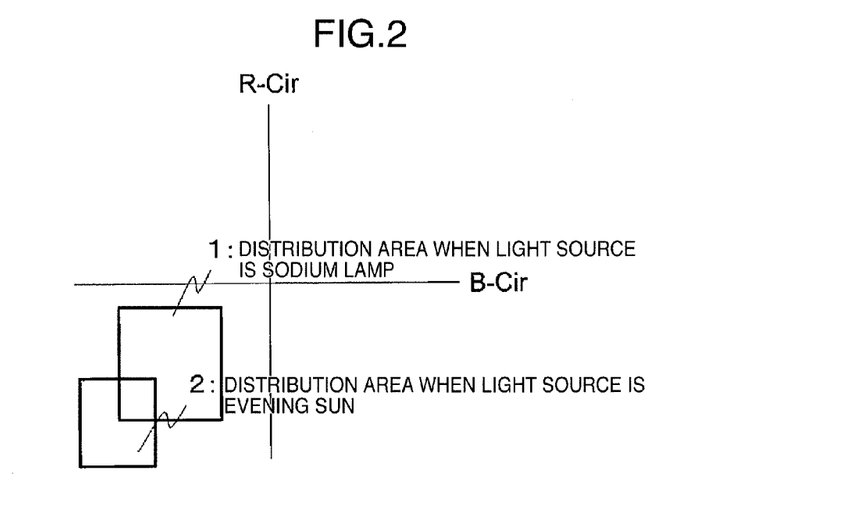
FIG. 2 is a diagram showing an R-Cir signal, B-Cir signal distribution plane and distribution decision areas.

Here, details of the light source discrimination and suitable white balance processing using the R signal, the B signal and the Cir signal will be described with reference to FIGS. 2 to 4. FIG. 2 is a diagram for explaining pixel signal distribution processing using an R-Cir signal, B-Cir signal distribution plane, as processing conducted by the pixel signal distribution processing unit in the on-vehicle imaging device. Here, the R signal is a signal of the red region which does not include the infrared region, the G signal is a signal of the green region which does not include the infrared region, the B signal is a signal of the blue region which does not include the infrared region, and the Cir signal is a signal including the all visible light region (C) and the infrared region (ir). An R-Cir signal is a difference signal obtained by subtracting the Cir signal from the R signal. A B-Cir signal is also obtained in the same way. This R-Cir signal, B-Cir signal distribution plane has an R-Cir signal axis as a Y axis, and has a B-Cir signal axis as an X axis. Signal distribution of an imaged scene of every light source is represented by plotting an imaged signal on the plane every pixel. Discrimination of the light source becomes possible by comparing the signal distribution with the signal distribution decision area. Details of discrimination processing will be described later with reference to FIG. 4. By the way, pixels to be plotted may be all pixels, or may be pixels in a part of imaged video.

As one example, an example of a signal distribution decision area of a sodium lamp light source and the evening sun on a horizontal plane is shown in FIG. 2. The sodium lamp light source includes little infrared light, and the evening sun includes much infrared light. In the R-Cir signal, B-Cir signal distribution plane, therefore, pixel signals of images imaged under both light sources exhibit different distribution. Taking this into account, for example, a signal distribution decision area indicated by frame 1 is set for an area where pixel signal distribution of the sodium lamp light source roughly distributes, and a signal distribution decision area indicated by frame 2 is set for an area where pixel signal distribution of the evening sun which closely resembles the hue of the sodium lamp roughly distributes. It becomes possible to distinguish both light sources by setting the decision areas in this way.

In the present example, the sodium light source can be distinguished from other light sources, especially from a light source resembling the sodium light source in hue and luminance, such as evening sun in sunlight, as described heretofore. By conducting white balance processing with predetermined values when the light source is judged to be a sodium light source, it becomes possible to execute white balance processing to make color reproduction similar to appearance viewed by human's eyes.

Figure 3:
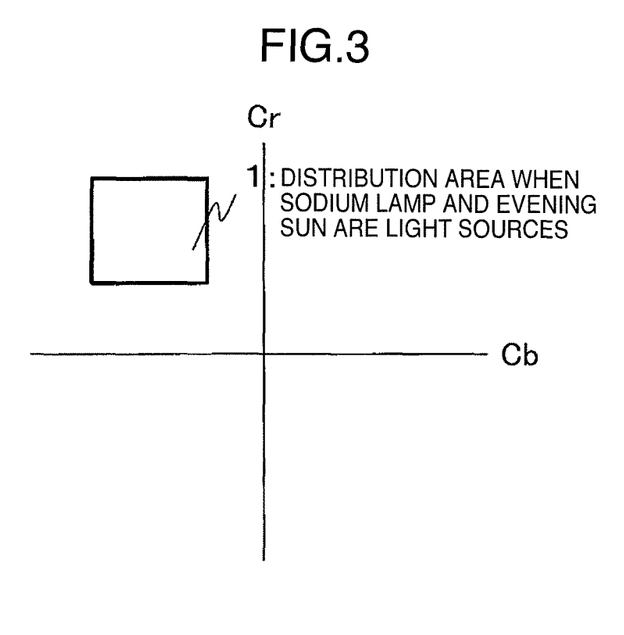
FIG. 3 is a diagram showing an R-Y signal, B-Y signal distribution plane.

By the way, in the processing indicated in Patent Literature 1, the sodium lamp light source and the evening sun light source are judged on the basis of whether a signal distributes in a specific area in the RGB space as shown in FIG. 3. It is considered to execute linear arithmetic operation on the RGB space, convert to a space represented by luminance (Y) and color difference (Cb/Cr), and show both light sources on a color difference plane. Then, the areas where pixel signal distribution of these two light sources roughly distributes become resembling signal distribution decision areas as indicated by frame 1. Therefore, it is difficult to distinguish the sodium light source from other light sources, especially from a light source resembling the sodium light source in hue and luminance, such as evening sun in sunlight. Therefore, it becomes difficult to exercise control such as matching the hue equivalent to appearance viewed by human's eyes under the sodium light source by setting predetermined values for signal processing in white balance processing on the basis of scene decision under the sodium lamp light source as described in the present example.

Furthermore, in a case where signal processing is conducted to, for example, make signal quantities of the R signal, G signal and the B signal equivalent as white balance processing under the sodium lamp light source, it is impossible to execute white balance processing to make color reproduction similar to appearance viewed by human's eyes, because signal quantities of the R signal, G signal and B signal are biased.

On a conventional color difference plane that does not use infrared region information as described in Patent Literature 1, light sources such as the sodium light source and the evening sun distribute in resembling areas on a plane and cannot be distinguished. On the signal plane in FIG. 2 in the present example, however, distribution is represented by using the R signal, the B signal, and the Cir signal including the infrared region information. Therefore, there is an advantage that it is possible to easily distinguish a difference between light sources, such as the sodium light source which does not include infrared region wavelengths and the evening sun including infrared wavelengths, on the basis of a difference in distribution areas on the two-dimensional plane. Furthermore, there is an advantage that it is possible to exercise control such as matching the hue equivalent to appearance viewed by human's eyes as a result of the light source distinguishing.

Figure 4:
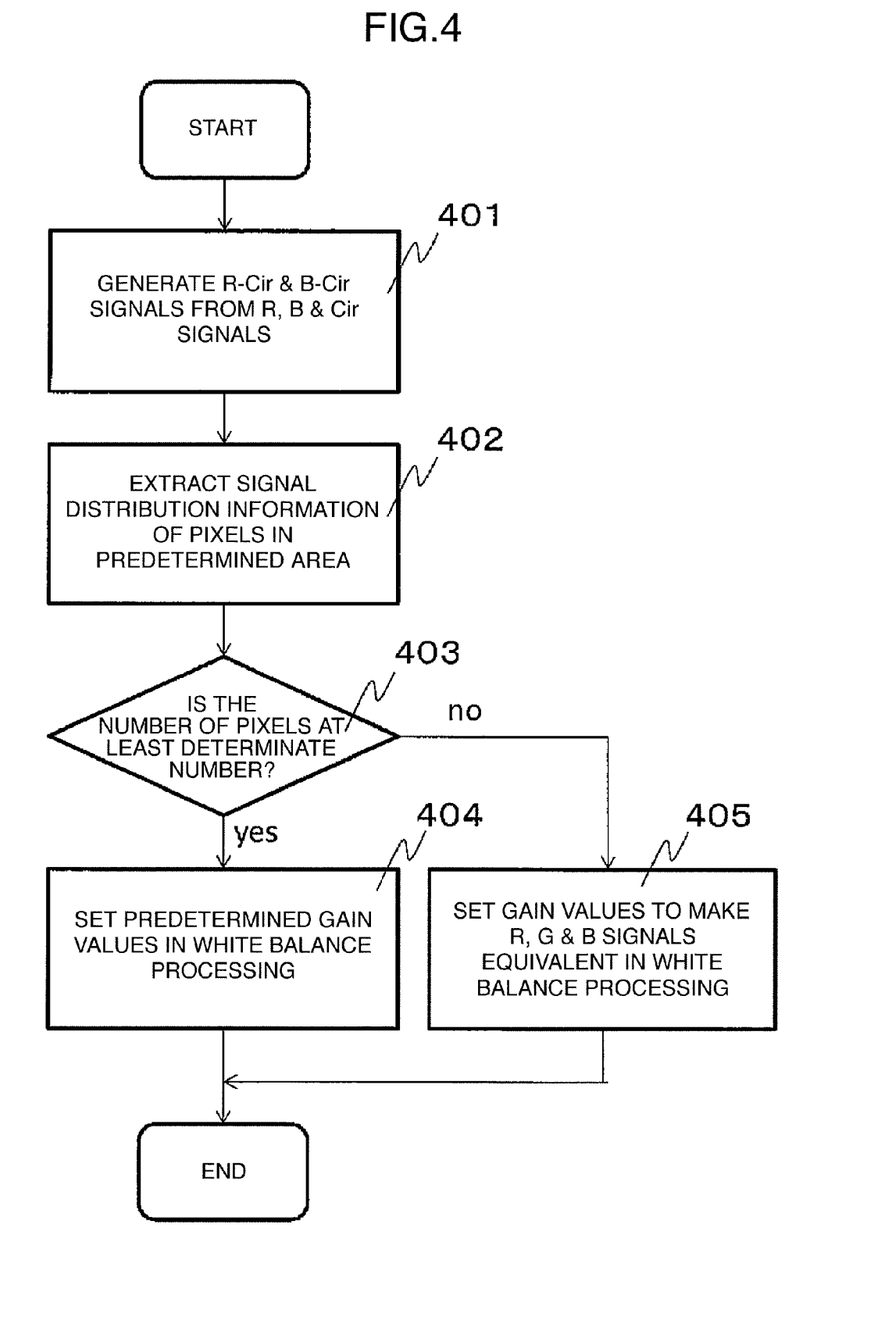
FIG. 4 is a diagram showing an example of a processing flow of light source discrimination and suitable white balance processing conducted by the on-vehicle imaging device.

FIG. 4 is a diagram for explaining an example of a processing flow of light source discrimination and suitable white balance processing conducted by the on-vehicle imaging device. First, at step 401, an R-Cir signal and a B-Cir signal are generated by using the R signal, the B signal and the Cir signal of the all visible light region including the infrared region. At step 402, pixel signals included in a predetermined signal area are detected and counted by using the R signal, the B signal, and the Cir signal, and pixel signal distribution information is extracted. The pixel signal distribution information of every area extracted by the pixel signal distribution processing unit 103 in this way is output to the system control unit 105. Here, the pixel signal distribution information refers to the number of pixels included in every signal distribution decision area.

Then, at step 403, the system control unit 105 determines whether the number of pixels included in a predetermined signal area is at least a predetermined value. For example, in the case of FIG. 2, it is determined whether each of the number of pixels included in the area of the frame 1 and the number of pixels included in the area of the frame 2 is at least a predetermined threshold. In a case where only the number of pixels included in the area of the frame 1 is at least the threshold, the light source is discriminated to be a sodium lamp and at step 404, white balance processing is controlled with a gain set value preset for sodium lamp beforehand. As for the gain set value, white balance is adjusted to hold color balance of a subject under, for example, a light source of 5500 kelvin as a color temperature of sunlight or 6500 kelvin called D65, and the gain set value is preset. In other cases, the light source is judged to be the sun at the time of evening sun or something other than the sodium lamp, and at step 405, white balance processing is controlled to, for example, make signal levels of the R signal, the G signal and the B signal equivalent.

In accordance with the flow described heretofore, a decision as to whether the light source is a predetermined light source is executed by using the number of pixels in an area based on the distribution area decision information. With simple processing, therefore, it becomes possible to conduct changeover between setting gains in the white balance processing unit to predetermined values and controlling the white balance processing to, for example, make signal levels of the R signal, the G signal and the B signal equivalent. As a result, it is possible to execute white balance processing with a light source corresponding to a scene estimated accurately. By the way, here, an example in which the system control unit 105 makes a decision whether the number of pixels is at least a threshold has been described. However, the pixel signal distribution processing unit 103 may make a decision every area and output a result of the decision to the system control unit 105.

By the way, for example, in a case where a power supply of the imaging device is on, or in a case where the white balance control is exercised, processing is executed consecutively from the flow 401 after the flow 404 or the flow 405 is finished. Furthermore, the present flow may be executed every frame, or may be executed at intervals of thinned frames.

Furthermore, the present example has been described by taking the sodium light source as an example. However, a light source for which pixels distribute in an arbitrary decision area is not restricted to the sodium lamp light source. For example, a scene of a mercury lamp light source can be judged by setting a decision area corresponding to the mercury lamp light source as the signal distribution decision area. When the scene is judged to be under a mercury lamp light source, setting to predetermined values is conducted for signal processing of white balance processing. As a result, it becomes possible to exercise control such as matching the hue equivalent to appearance viewed by human's eyes under the mercury lamp.

Furthermore, even if the scene is not under the sodium light source or under the mercury lamp light source, a decision area is set and setting to predetermined values for signal processing of white balance processing is conducted, in accordance with the specific light source. As a result, there is an advantage that it is possible to easily distinguish a difference between light sources, such as the evening sun including infrared wavelengths, on the basis of a difference in distribution areas on the two-dimensional plane, in the same way as the processing at the time of the sodium light source.

Furthermore, there is an advantage that it is possible to exercise control such as matching the hue equivalent to appearance viewed by human's eyes as a result of the light source distinguishing.

Furthermore, in the present example, pixel signal distribution processing is executed by using the R-Cir signal and the B-Cir signal. However, R or B may be G.

Figure 9:
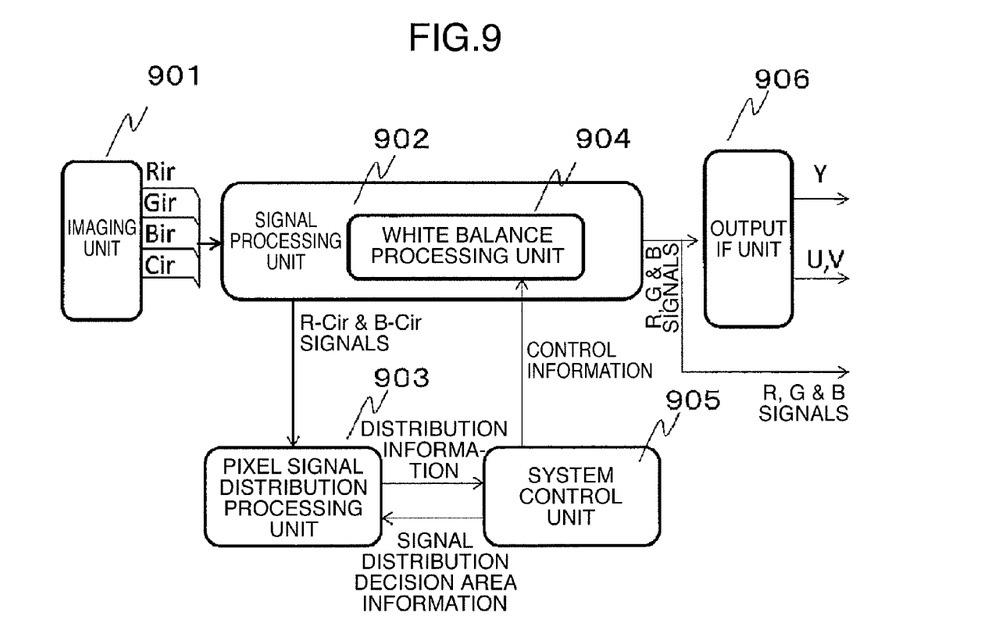
FIG. 9 is a block diagram showing another embodiment of the on-vehicle imaging device according to the present invention.

Furthermore, as a modification of FIG. 1, outputs from the imaging unit may be Rir, Gir, Bir, and Cir, and signals supplied from the signal processing unit to the pixel signal distribution processing unit may be R-Cir and B-Cir signals as shown in FIG. 9. Here, an Rir signal means a signal component including both an R component and an infrared ray it component. As for Gir and Bir as well, the same holds true. Furthermore, the output IF unit converts the R, G and B signals to a Y signal and a U and V signal, and outputs resultant signals. However, the R, G and B signals may be output as shown in FIG. 9.

Example 2

Figure 5:
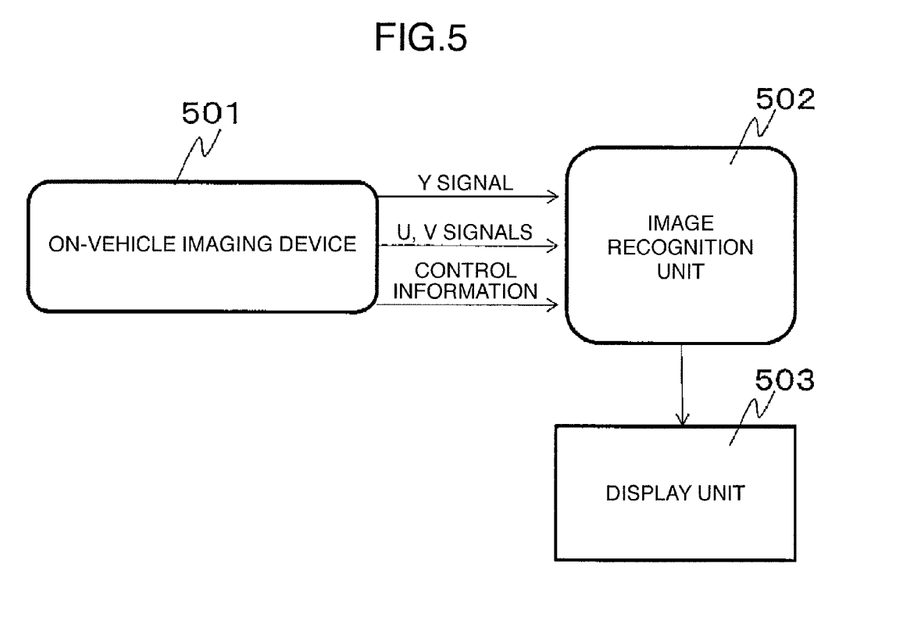
FIG. 5 is a block diagram of a first embodiment of an on-vehicle imaging system according to the present invention.

FIG. 5 is a diagram for explaining an example of an on-vehicle imaging system in which an image recognition device conducts recognition processing on an image obtained by the on-vehicle imaging device in the first example. The on-vehicle imaging system is configured by suitably using an on-vehicle imaging device 510, an image recognition unit 502, and a display unit 503.

Figure 6A:
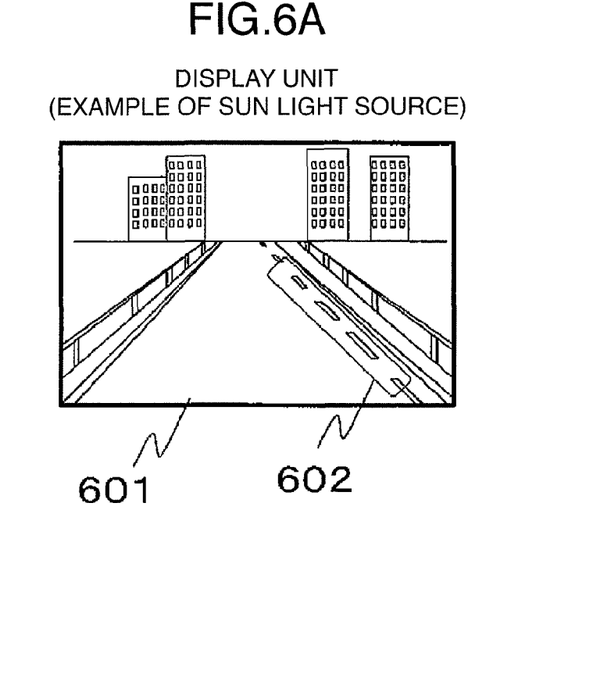
FIG. 6A is a diagram showing a display example in a display unit in the first embodiment of the on-vehicle imaging system according to the present invention.
Figure 6B:
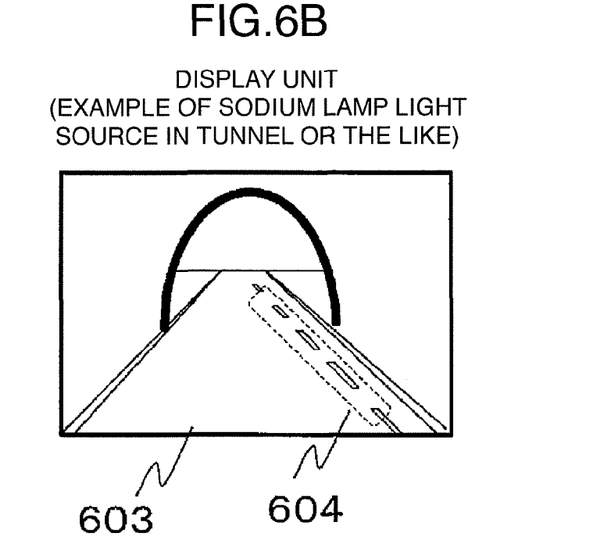
FIG. 6B is a diagram showing a display example in a display unit in the first embodiment of the on-vehicle imaging system according to the present invention.

Even if matching the hue equivalent to appearance viewed by human's eyes is conducted under a light source for which white balance cannot be processed correctly, the hue differs from the correct hue of the subject. For example, in a case where image recognition processing is conducted, the possibility that correct recognition cannot be done is high. When the light source is judged to be a specific light source such as a sodium lamp light source on the basis of distribution information depending upon the light source, therefore, in the present example, the on-vehicle imaging device gives a notice that the image is an image in which color reproduction is not correct and there is a possibility of lowering of recognition precision to the image recognition unit 502 or the like as control information. By giving a notice of such control information, it becomes possible to use a recognition result processed by the image recognition unit 502 as information for judging accuracy of the recognition result. For example, in a case where accuracy of a recognition result of a white line or a yellow line on the road is low, it becomes possible to display the accuracy of recognition by changing the color or a line shape as an example of a display scheme indicating a lane recognition result. In FIG. 6A, a lane recognition result 602 in a display unit 601 shows an image example in which color reproduction of a white line under the sun light source is correct and the accuracy of white line recognition is high. In FIG. 6B, a lane recognition result 604 in a display unit 603 shows an image example in which color reproduction of a white line in a tunnel under a sodium lamp light source is poor and the accuracy of white line recognition is low. There is an advantage that the reliability of the image recognition processing result can be made high, besides the advantage that a difference in light source can be distinguished easily on the basis of a difference in distribution area on the two-dimensional plane.

Example 3

Figure 7:
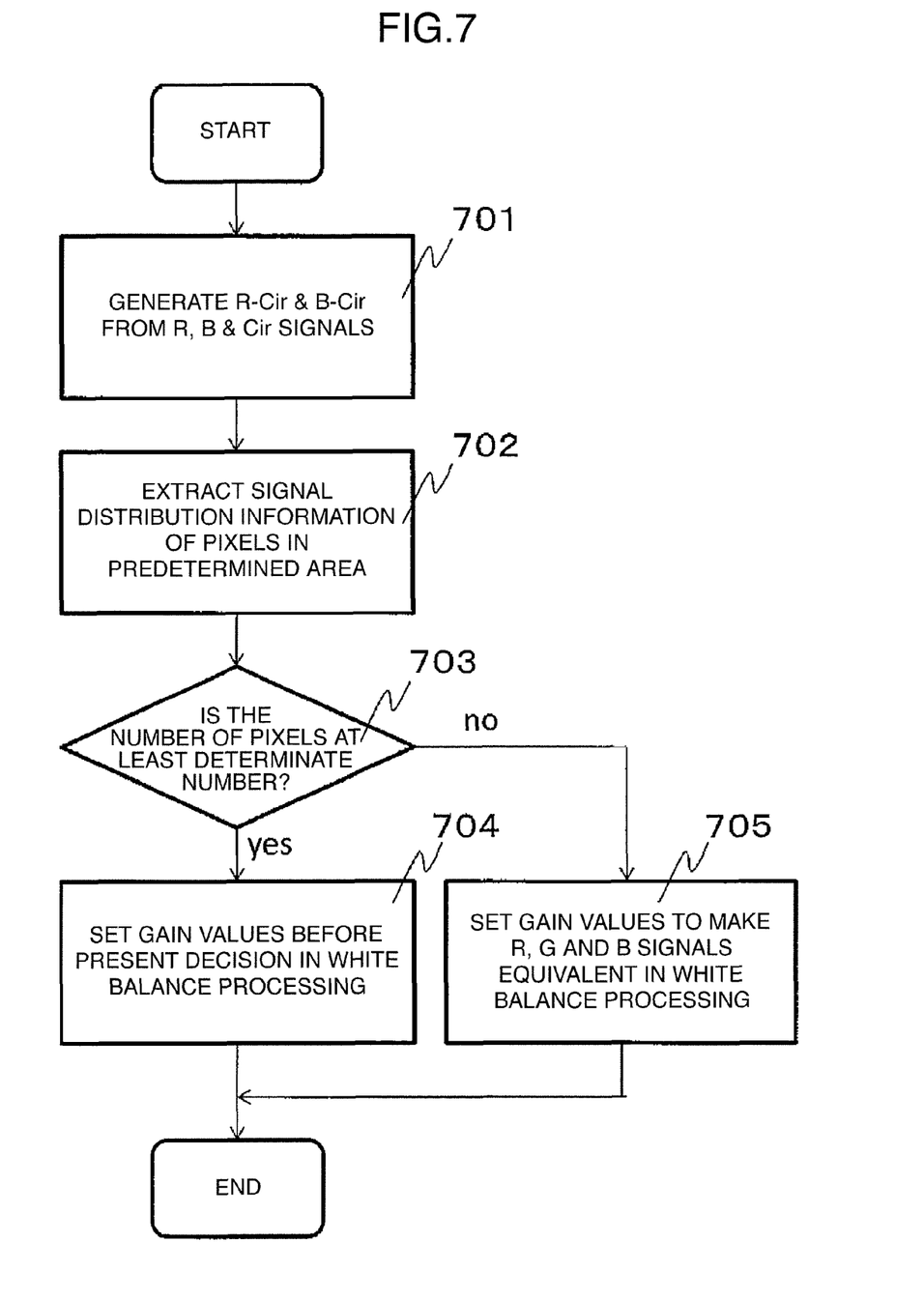
FIG. 7 is a diagram showing another example of a processing flow of light source discrimination and suitable white balance processing conducted by the on-vehicle imaging device.

An example of an on-vehicle imaging device that is similar in configuration to the on-vehicle imaging device in the first example and that differs in light source discrimination and processing flow of suitable white balance processing from the on-vehicle imaging device in the first example will now be described with reference to FIG. 7. Steps 701 to 703 and 705 are similar to the steps 401 to 403 and 405. At the step 701, the R-Cir signal and the B-Cir signal are generated by using the R signal, the B signal, and the Cir signal of the all visible light region including the infrared region. At the step 702, pixel signals included in predetermined signal areas are extracted from the R-Cir signal and the B-Cir signal. At the step 703, a decision is made whether the number of pixels included in a predetermined signal area is at least a determinate number.

At step 704, in a case where the number of pixels included in a predetermined signal area is at least a determinate number, white balance processing is controlled with gain set values before the present decision. Here, the present decision means a case where the number of pixels included in a predetermined signal area is judged to be at least a determinate number in, for example, a scene under a sodium lamp light source in a tunnel. Furthermore, the gain set values before the present decision means gain set values with which white balance was adjusted in, for example, a situation before the scene is judged to be under the sodium lamp light source in a tunnel or the like, i.e., under sunlight environment outside the tunnel or the like. At step 705, in a case where the number of pixels included in a predetermined signal area is not at least the determinate number, white balance processing is controlled to, for example, make signal levels of the R signal, the G signal and the B signal equivalent.

There is an advantage that the sodium light source and the like can be distinguished easily on the basis of a difference of a distribution area on the two-dimensional plane by conducting processing in accordance with the flow described heretofore. In addition, as a result of the sodium light source distinguishing, the gain value setting of white balance before distinguishing of the sodium light source can be maintained. As a result, there is an advantage that the gain value setting of white balance does not vary and continuity is maintained between scenes before and after the judgment that the light source is a sodium light source.

By the way, for example, in a case where a power supply of the imaging device is on, or in a case where the white balance control is exercised, processing is executed consecutively from the step 701 after the step 704 or the step 705 is finished. Furthermore, the present flow may be executed every frame, or may be executed at intervals of thinned frames.

Example 4

Figure 8:
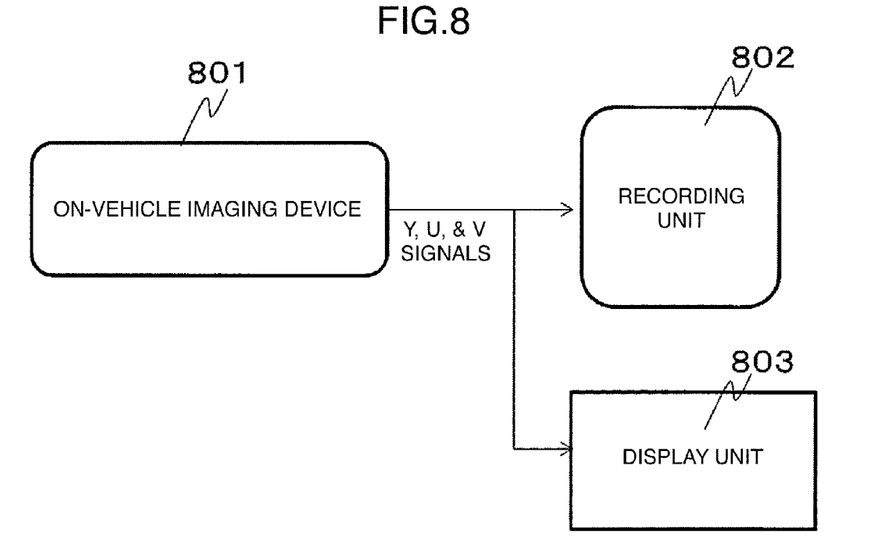
FIG. 8 is a block diagram of a second embodiment of an on-vehicle imaging system according to the present invention.

FIG. 8 is a diagram showing an example of an on-vehicle imaging system in which the on-vehicle imaging device is applied to use of projection to an on-vehicle recorder and a monitor. In FIG. 8, 802 denotes a recording unit which records an image of the on-vehicle imaging device during travel of the vehicle, and 803 denotes a display unit which projects the image captured by the on-vehicle imaging device 801.

In the present on-vehicle imaging system, there is an advantage that an image captured and recorded in a tunnel scene under a sodium light source or the like and an image displayed on the display unit become optimum images by controlling white balance processing according to a light source such as a sodium light source or sunlight as described in example 1 and so forth.

By the way, in the on-vehicle imaging system shown in FIG. 5 or FIG. 8, the Y signal and the U and V signal (luminance signal and color difference signal) are output to the recognition processing unit, the recording unit, and the display unit. However, the R, G and B signals may be output.

The present invention is not restricted to the above-described examples, but various modifications are included. For example, the above-described examples have been described in detail in order to describe the present invention intelligibly, and examples are not necessarily restricted to examples having all described configurations. Furthermore, it is possible to replace a part of a configuration in an example by a configuration in another example, and it is possible to add a configuration in an example to a configuration in another example. Furthermore, as for a part of a configuration in each example, it is possible to conduct addition, deletion, and replacement of another configuration.

As for each of the above-described configurations, a part or the whole thereof may be implemented by hardware, or may be implemented by executing a program in a processor. As for control lines and information lines, those considered to be necessary for description are shown. All control lines and information lines on products are not necessarily shown. As a matter of fact, it may be considered that almost all components are connected to each other.

The above-described description has been made on examples. However, the present invention is not restricted to the examples. It is apparent to those skilled in the art that various changes and modifications can be made without departing from the spirit of the present invention and the scope of accompanying claims.

REFERENCE SIGNS LIST

101: Imaging unit
102: Signal processing unit
103: Pixel signal distribution processing unit
104: White balance processing unit
105: System control unit
106: Output IF unit

The invention claimed is:

1. An on-vehicle imaging device mounted on a vehicle, the on-vehicle imaging device comprising:
an image sensor for imaging a subject and having a sensitivity in at least a red region (hereafter referred to as R), a green region (hereafter referred to as G), a blue region thereafter referred to as B), and an all visible light region and an infrared region (hereafter referred to as Cir);
at least one processor for executing stored instructions to:
execute signal processing on a video signal in at least a plurality of different bands included in a video imaged by the image sensor;
extract pixel signal distribution information depending on at least one signal included in the processed video signal;
conduct signal processing by using predetermined gains to cause the video signal to have a desired value for white balance processing;
perform control on the white balance processing and perform control on decision area information for the pixel signal distribution information extraction;
set gains in the white balance processing to predetermined values in accordance with the extracted pixel signal distribution information;
determine whether a number of pixels distributed in at least one predetermined decision area of the pixel signal distribution information is equal to or greater than a predetermined threshold value; and
extract pixel signal distribution information for at least one decision area by using at least two signals from among an R signal, a G signal, and a B signal and using a Cir signal.

2. An on-vehicle imaging device mounted on a vehicle, the on-vehicle imaging device comprising:
an image sensor for imaging a subject and having a sensitivity in at least a red region (hereafter referred to as R), a green region (hereafter referred to as G), a blue region thereafter referred to as B), and an all visible light region and an infrared region (hereafter referred to as Cir);
at least one processor for executing stored instructions to:
execute signal processing on a video signal in at least a plurality of different bands included in a video imaged by the image sensor;
extract pixel signal distribution information depending on at least one signal included in the processed video signal;
conduct signal processing by using predetermined gains to cause the video signal to have a desired value for white balance processing;
perform control on the white balance processing and perform control on decision area information for the pixel signal distribution information extraction;
set gains in the white balance processing to predetermined values in accordance with the extracted pixel signal distribution information;
determine whether a number of pixels distributed in at least one predetermined decision area of the pixel signal distribution information is equal to or greater than a predetermined threshold value; and
extract pixel signal distribution information for at least one decision area by using at least two signals from among a difference signal between an R signal and a Cir signal, a difference signal between a G signal and the Cir signal, and a difference signal between a B signal and the Cir signal.

3. The on-vehicle imaging device according to claim 1, wherein in a case where it is determined that the number of pixels distributed in the at least one predetermined decision area of the pixel signal distribution information is equal to or greater than the predetermined threshold value, the at least one processor sets gain values for characteristics of holding color balance of a subject under a specific light source in the white balance processing.

4. The on-vehicle imaging device according to claim 2, wherein in a case where it is determined that the number of pixels distributed in the at least one predetermined decision area of the pixel signal distribution information is equal to or greater than the predetermined threshold value, the at least one processor sets gain values for characteristics of holding color balance of a subject under a specific light source in the white balance processing.

5. The on-vehicle imaging device according to claim 1, wherein in a case where it is determined that the number of pixels distributed in the at least one predetermined decision area of the pixel signal distribution information is greater than the predetermined threshold value, the at least one processor sets gain values in a state before the determinate number of pixels distribute in the decision area, in the white balance processing.

6. The on-vehicle imaging device according to claim 2, wherein in a case where it is determined that the number of pixels distributed in the at least one predetermined decision area of the pixel signal distribution information is greater than the predetermined threshold value, the at least one processor sets gain values in a state before the determinate number of pixels distribute in the decision area, in the white balance processing.

* * * * *